US009512526B2

(12) United States Patent
McDonald et al.

(10) Patent No.: US 9,512,526 B2
(45) Date of Patent: Dec. 6, 2016

(54) WATER OXIDATION CATALYST INCLUDING LITHIUM COBALT GERMANATE

(71) Applicant: Toyota Motor Engineering & Manufacturing North America, Inc., Erlanger, KY (US)

(72) Inventors: Kenneth James McDonald, Whitmore Lake, MI (US); Hongfei Jia, Ann Arbor, MI (US); Chen Ling, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 147 days.

(21) Appl. No.: 14/134,889

(22) Filed: Dec. 19, 2013

(65) Prior Publication Data

US 2015/0176144 A1    Jun. 25, 2015

(51) Int. Cl.
*C25B 11/04* (2006.01)
*C01G 51/00* (2006.01)
*C25B 1/04* (2006.01)

(52) U.S. Cl.
CPC .......... *C25B 11/0452* (2013.01); *C01G 51/42* (2013.01); *C25B 1/04* (2013.01); *C25B 11/0405* (2013.01); *C01P 2002/72* (2013.01); *C01P 2002/85* (2013.01); *C01P 2002/89* (2013.01); *C01P 2004/03* (2013.01); *C01P 2004/62* (2013.01); *C01P 2006/40* (2013.01); *Y02E 60/366* (2013.01); *Y10T 428/2982* (2015.01)

(58) Field of Classification Search
CPC ... C25B 11/0452; C25B 11/0405; C01G 51/42
See application file for complete search history.

(56) References Cited

U.S. PATENT DOCUMENTS

| | | | |
|---|---|---|---|
| 4,132,620 A | 1/1979 | Nidola et al. | |
| 2004/0131939 A1* | 7/2004 | Adamson | H01M 4/382 429/231.9 |
| 2004/0197654 A1* | 10/2004 | Barker | H01M 4/13 429/218.1 |
| 2005/0260498 A1* | 11/2005 | Saidi | H01M 4/131 429/231.9 |
| 2010/0101955 A1 | 4/2010 | Nocera et al. | |
| 2010/0133110 A1 | 6/2010 | Nocera et al. | |
| 2010/0133111 A1 | 6/2010 | Nocera et al. | |
| 2010/0143811 A1 | 6/2010 | Brimblecombe et al. | |
| 2010/0210454 A1 | 8/2010 | Epshteyn et al. | |
| 2010/0279117 A1* | 11/2010 | Gu | C01B 25/37 428/402 |
| 2011/0127170 A1 | 6/2011 | Gerken et al. | |
| 2013/0040806 A1 | 2/2013 | Dismukes et al. | |

OTHER PUBLICATIONS

Novel LISICON mixed conductors, $Li_{4-2x}Co_xGeO_4$, H.H. Sumathipala et al., Solid State Ionics 86-88 (1996) 719-724.

(Continued)

*Primary Examiner* — Nicholas A Smith
(74) *Attorney, Agent, or Firm* — Dinsmore & Shohl LLP

(57) ABSTRACT

The present disclosure provides a method or process, apparatus and/or composition for catalyzing the oxidation of water to generate hydrogen ions and oxygen. The catalyst includes lithium cobalt germinate.

20 Claims, 7 Drawing Sheets

(56) References Cited

OTHER PUBLICATIONS

Jia, H., Stark, J., Zhou, L. Q., Ling, C., Sekito, T., and Markin, Z. Different catalytic behavior of amorphous and crystalline cobalt tungstate for electrochemical water oxidation. RSC Advances, 2012. 2, 10874-10881.

Dinca, M., Surendranath, Y., and Nocera, D. G. Nickel-Borate oxygen-evolving catalyst that functions under benign conditions. Proceedings of the National Academy of Sciences of the United States of America. 2010, 107, 10337-10341.

Kanan, M.W. and D.G. Nocera, In Situ Formation of an Oxygen-Evolving Catalyst in Neutral Water Containing Phosphate and Co2+. Science, 2008. 321(5892): p. 1072-1075.

Feng Jiao, H.F., Nanostructured Cobalt Oxide Clusters in Mesoporous Silica as Efficient Oxygen-Evolving Catalysts. Angewandte Chemie International Edition, 2009. 48(10): p. 1841-1844.

Lee, S.W.; Carlton, C.; Risch, M.; Surendranath, Y.; Chen, S.; Furutsuki, S.; Yamada, A.; Nocera, D.G.; and Shao-Horn, Y. The Nature of Lithium-Battery Materials Under Oxygen Evolution Reaction Conditions. Journal of the American Chemical Society, 2012. 134(41): p. 16959-16962.

Yin, Q., et al., A Fast Soluble Carbon-Free Molecular Water Oxidation Catalyst Based on Abundant Metals. Science, 2010. 328(5976): p. 342-345.

Suntivich, J., May, K. J., Gasteiger, H. A., Goodenough, J. B., and Shao-Horn, Y. A Perovskite Oxide Optimized for Oxygen Evolution Catalysis from Molecular Orbital Principles. Science, 2011, 334, 6061, 1383-1385.

McCrory, C. C. L.; Jung, S.; Peters, J. C.; and Jaramillo, T. F. Benchmarking Heterogeneous Electrocatalysts for the Oxygen Evolution Reaction. Journal of the American Chemical Society. 2013. ASAP. dx.doi.org/10.1021/ja407115p.

\* cited by examiner

EDX spectra of Li$_2$CoGeO$_4$

| Element Concentration | [% wt] | [% mol] |
|---|---|---|
| Li | 6.54 | 2.3 |
| Co | 23.9 | 1 |
| Ge | 32.7 | 1.1 |

ICP elemental data

Figure 5

WATER OXIDATION CATALYST INCLUDING LITHIUM COBALT GERMANATE

FIELD OF THE INVENTION

The invention relates to catalysts for electrochemical water oxidation and oxygen evolution.

BACKGROUND OF THE INVENTION

Hydrogen has long been considered an ideal fuel source, as it offers a clean, non-polluting alternative to fossil fuels. One source of hydrogen is the splitting of water into hydrogen ($H_2$) and oxygen ($O_2$), as depicted in equation (1).

$$2H_2O \rightarrow O_2 + 2H_2 \quad (1)$$

In an electrochemical half-cell, the water-splitting reaction comprises two half-reactions:

$$2H_2O \rightarrow O_2 + 4H^+ + 4e^- \quad (2)$$

$$2H^+ + 2e^- \rightarrow H_2 \quad (3)$$

and hydrogen made from water using sunlight prospectively offers an abundant, renewable, clean energy source. While the reduction of protons to form hydrogen is a relatively easy and efficient reaction, the oxygen evolution reaction requires a much higher driving force to overcome the activation energy barriers associated with the reaction as the reaction includes multiple proton coupled electron transfer processes. As such, efforts have been made to search for efficient water oxidation and oxygen evolution reaction (OER) catalysts that can produce oxygen and hydrogen ions from water. In particular, oxides of ruthenium and iridium have previously been identified. However, as they are among the rarest elements on earth, it is not practical to use these catalysts on a large scale. There is therefore a need for improved water oxidation and OER catalysts.

SUMMARY OF THE INVENTION

In one aspect there is disclosed a water oxidation catalyst that splits water into oxygen and hydrogen ions that includes lithium cobalt germanate.

In another aspect, there is disclosed an oxygen evolution catalyst that splits water into oxygen and hydrogen ions that includes lithium cobalt germanate.

In a further aspect there is disclosed an electrode for electrochemical water oxidation splitting water into oxygen and hydrogen ions that includes a substrate and an active material in contact with the substrate. The active material includes lithium cobalt germanate.

In another aspect there is disclosed a process for oxidizing water that includes the steps of: providing an electrode including lithium cobalt germanate; providing water and a supporting electrolyte; and placing the water and supporting electrolyte into contact with the lithium cobalt germanate with an applied oxidative over-potential catalyzing the oxidation of water into oxygen and hydrogen ions.

In a further aspect there is disclosed a process of forming a water oxidation catalyst including the steps of: providing LiOH; providing $GeO_2$; combining the LiOH and $GeO_2$ forming a first solution; providing $CoCl_2$ in a solvent; combining the first solution and $CoCl_2$ in solvent forming a second solution; exposing the second solution to a hydrothermal reaction forming $Li_2CoGeO_4$.

BRIEF DESCRIPTION OF THE FIGURES

FIG. 5 is chart detailing the ICP data for $Li_2CoGeO_4$.

DETAILED DESCRIPTION OF THE INVENTION

Figure 1:
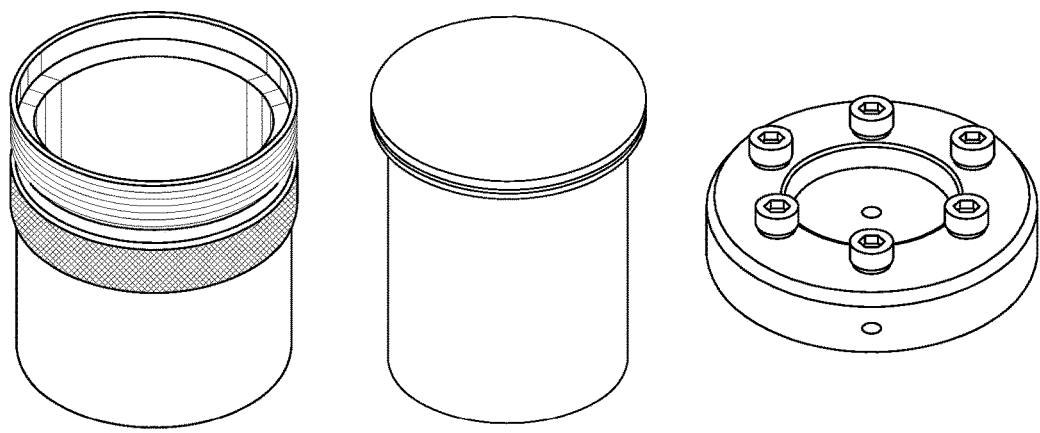
FIG. 1 is a graphic depiction of a thermal bomb reactor utilized in the synthesis of $Li_2CoGeO_4$.

The present disclosure provides a method or process, apparatus and/or composition for catalyzing the oxidation of water to generate hydrogen ions and oxygen.

A "catalyst" as used herein, means a material that is involved in and increases the rate of a chemical electrolysis reaction (or other electrochemical reaction) and which itself, undergoes reaction as part of the electrolysis, but is largely unconsumed by the reaction itself, and may participate in multiple chemical transformations. A catalytic material of the invention may be consumed in slight quantities during some uses and may be, in many embodiments, regenerated to its original chemical state. The reaction may include a water oxidation or oxygen evolution reaction.

In one aspect a water oxidation catalyst or an oxygen evolution catalyst includes lithium cobalt germanate that splits water into oxygen and hydrogen ions.

In a further aspect there is disclosed an electrode for electrochemical water oxidation splitting water into oxygen and hydrogen ions that includes a substrate and an active material in contact with the substrate. The active material includes lithium cobalt germanate.

The catalyst can include a plurality of lithium cobalt germanate nanoparticles. In some instances, the nanoparticles are uniform in size and can have an average particle size of less than 1 micron. In another aspect, the nanoparticles may have a size of 500 nanometers or less.

In one aspect, the lithium cobalt germanate may be combined with conductive particles such as carbon black and may also include a binder such as NAFION®, a sulfonated tetrafluoroethylene based fluoropolymer copolymer sold by DuPont. The combined material may be attached to an electrode substrate using any method known to those in the art. Various electrode substrates may be utilized that are capable of conducting current such as for example, glassy carbon.

The electrode may be a part of an electrochemical cell that is utilized to split water into oxygen and hydrogen ions. Various electrochemical cells may be utilized included photovoltaic cells and cells that have an externally applied potential. The electrochemical cell may include a container such as a receptacle, carton, can or jar, in which components of an electrochemical device may be held or carried. A container may be fabricated using any known techniques or materials, as will be known to those of ordinary skill in the art. The container may have any shape or size, providing it can contain the components of the electrochemical device. Components of the electrochemical device may be mounted in the container. That is, a component, for example, an electrode, may be associated with the container such that it is immobilized with respect to the container, and in some cases, supported by the container.

In one aspect, an electrochemical cell containing an embodiment of the present invention offers a highly efficient method of splitting water using solar illumination, without the need for an applied potential. Upon oxidation of water at a photo-anode, oxygen is released and hydrogen protons are generated which may then be reduced to form hydrogen gas at a counter electrode.

Alternatively, the electrochemical cell may include an external source providing an over potential to the cell. Various electrolytes may be utilized in the electrochemical cell that are compatible with the lithium cobalt germinate material. One example of a supporting electrolyte includes $NaH_2PO_4Na_2SO_4$.

In another aspect there is disclosed a process for oxidizing water that includes the steps of: providing an electrode including lithium cobalt germanate; providing water and a supporting electrolyte; and placing the water and supporting electrolyte into contact with the lithium cobalt germinate with an applied oxidative over-potential catalyzing the oxidation of water into oxygen and hydrogen ions.

In a further aspect there is disclosed a process of forming a water oxidation catalyst including the steps of: providing LiOH; providing $GeO_2$; combining the LiOH and $GeO_2$ forming a first solution; providing $CoCl_2$ in a solvent; combining the first solution and $CoCl_2$ in solvent forming a second solution; exposing the second solution to a hydrothermal reaction forming $Li_2CoGeO_4$.

Various solvents may be utilized such as for example ethylene glycol. The process may include placing the second solution in a hydrothermal bomb at a temperature of 150 degrees centigrade for 72 hours. The process may also include the step of washing and drying the $Li_2CoGeO_4$ following the hydrothermal reaction. The process may further include the step of grinding the $Li_2CoGeO_4$ following the drying step separating the $Li_2CoGeO_4$ into particles. The process provides a mechanism to form the catalytic material without complicated manufacturing steps and may be scaled to produce various quantities of materials.

The invention is further described by the following examples, which are illustrative of specific modes of practicing the invention and are not intended as limiting the scope of the invention defined in the claims.

EXAMPLES

Preparation of $Li_2CoGeO_4$ $Li_2CoGeO_4$ was synthesized by dissolving 0.05 mol of LiOH and 0.0125 mol of $GeO_2$ into 20 mL of water. Then in a separate container 0.0125 mol $CoCl_2$ was dissolved into 10 mL of ethylene glycol. The two solutions were then mixed in a Teflon cup together and placed in a hydrothermal bomb apparatus as shown in FIG. 1. The apparatus was subjected to a temperature of 150 C for 72 hrs. After 72 hrs, the bomb was removed from the heat source and the solids were filtered/washed with water and then dried in a vacuum oven overnight. After drying the powder was ground with a mortar and pestle to separate the solid particles.

Figure 2:
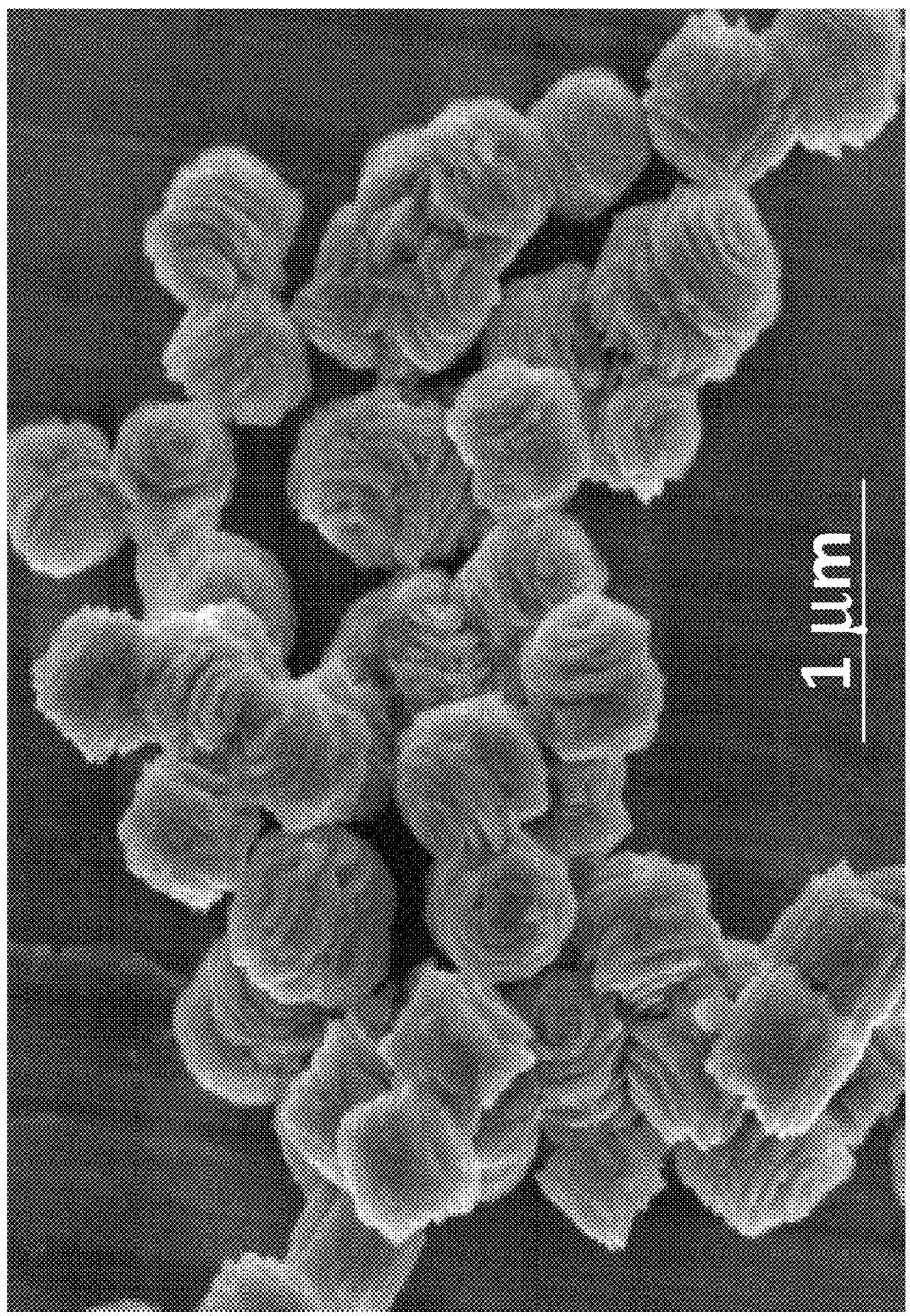
FIG. 2 is a scanning electron microscopy (SEM) images of crystalline $Li_2CoGeO_4$ nanoparticles.
Figure 3:
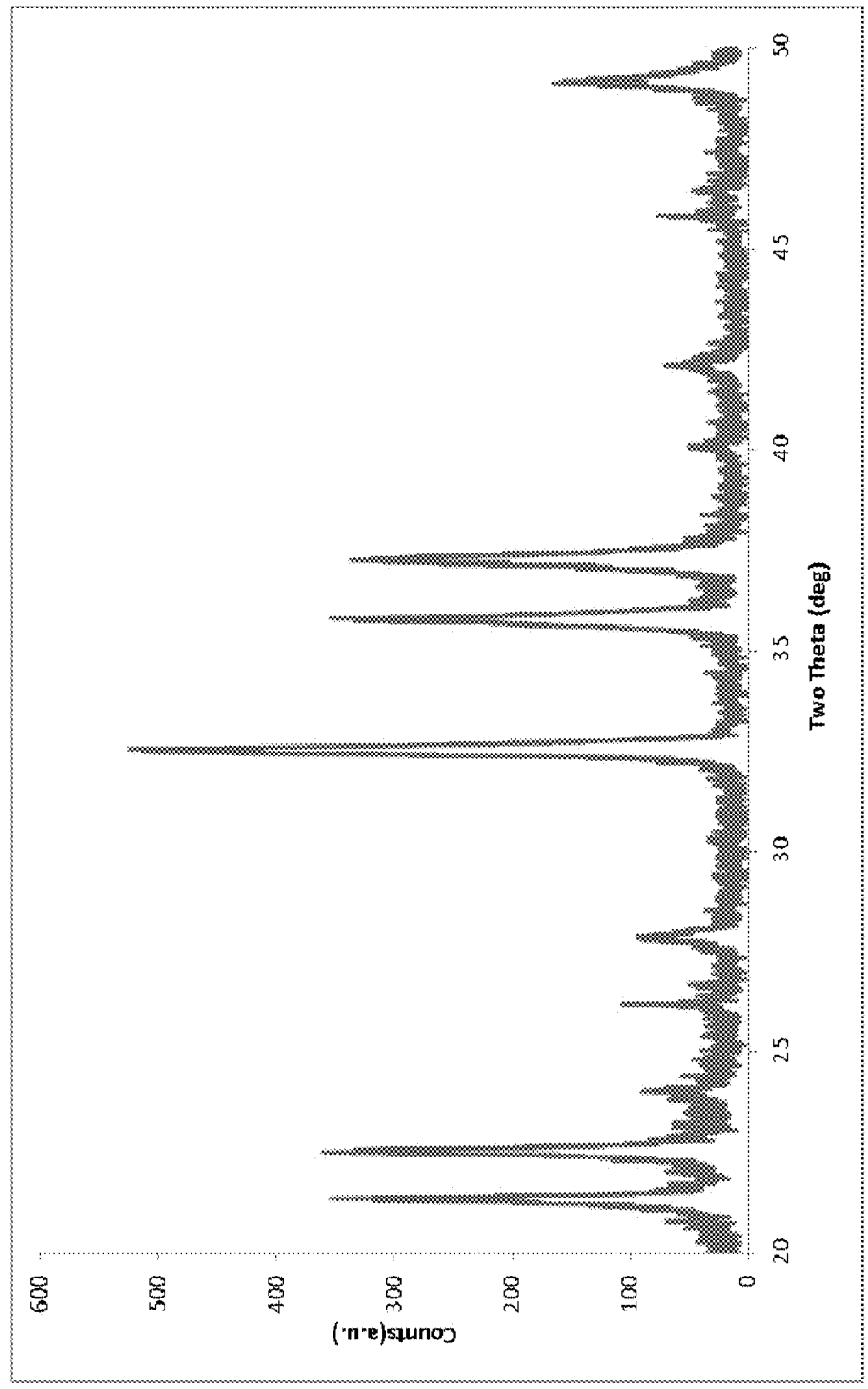
FIG. 3 is an x-ray diffraction plot of $Li_2CoGeO_4$.
Figure 4:
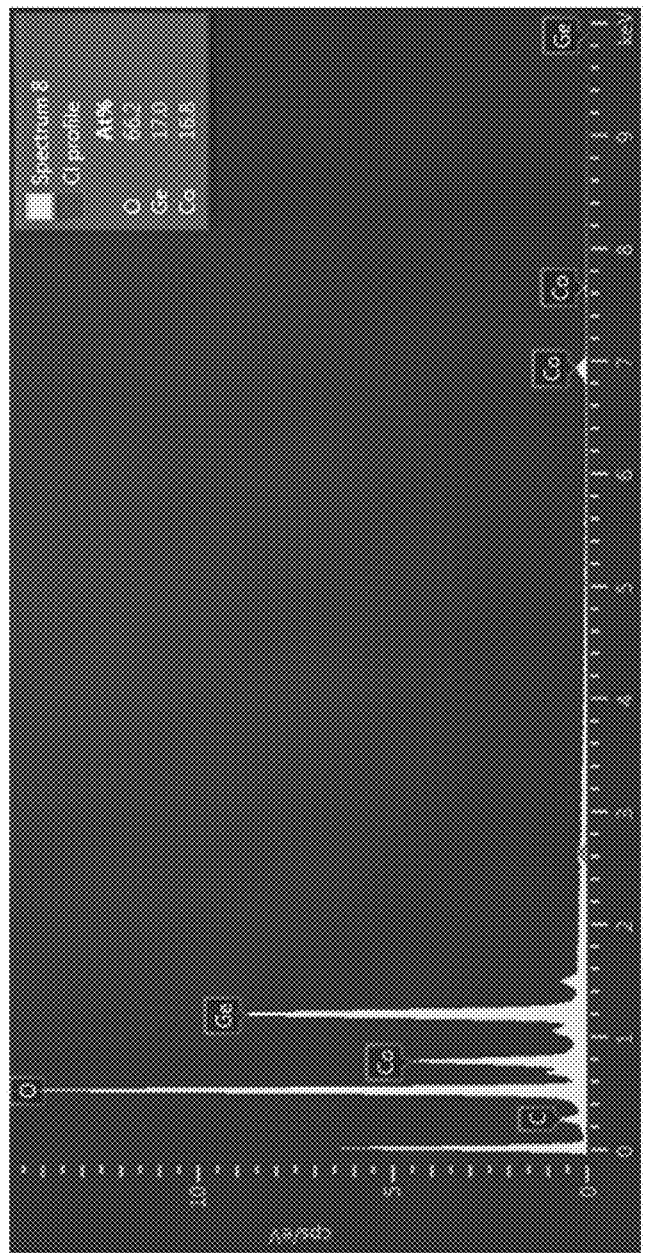
FIG. 4 is an EDX plot of $Li_2CoGeO_4$.

The final powder was examined by SEM (FIG. 2), x-ray diffraction (FIG. 3) and energy dispersive x-ray (EDX) analysis (FIG. 4). The SEM images indicate the $Li_2CoGeO_4$ particles have a particle size of less than 1 micrometer and about 500 nm. The x-ray diffraction confirms a crystalline composition having peaks corresponding to the formation of $Li_2CoGeO_4$. The EDX data in conjunction with the ICP data of FIG. 5 confirms the formation of a material that includes Li, Co, Ge and O. Additionally, the material formed includes a ratio of Co:Ge near 1:1.

Example II

Cyclic Voltammetry (CV) of $Li_2CoGeO_4$ $Li_2CoGeO_4$ particles were combined with carbon black using nafion as a binder and then drop casted onto a glassy carbon electrode. To verify the catalytic activity, cyclic voltammetry experiments were conducted.

Figure 6:
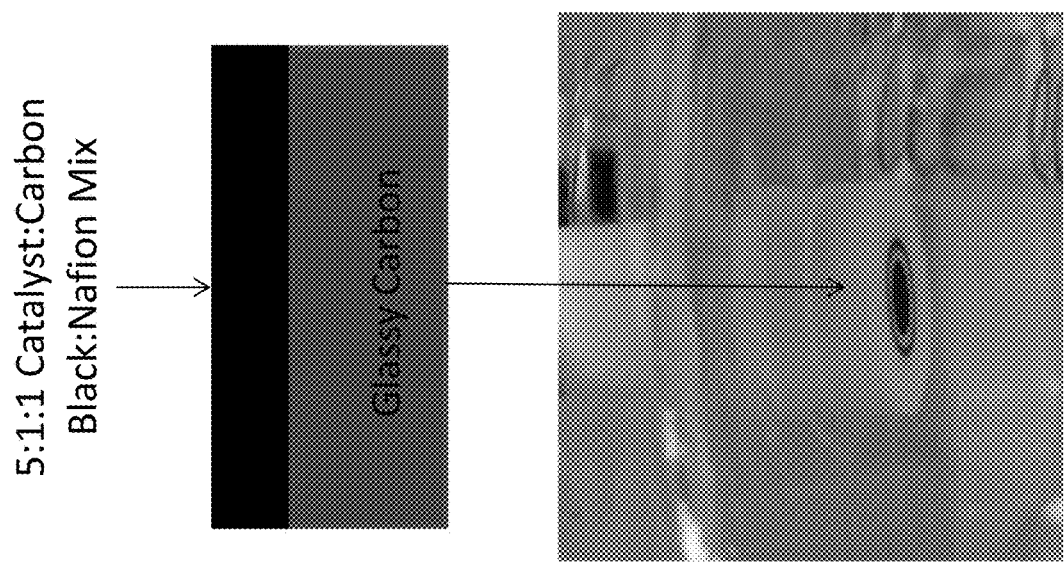
FIG. 6 is a graphic depiction of an electrochemical testing apparatus for testing $Li_2CoGeO_4$.

A rotating disk electrode apparatus, as shown in FIG. 6, having a polished glassy carbon substrate was cast with an active material having 5:1:1 by weight—$Li_2CoGeO_4$:carbon black:nafion. The voltage testing was performed at a rotating speed of 1600 rpm. An electrolyte of 0.4M $NaH_2PO_4$ 0.6M $Na_2SO_4$ pH 7 ($O_2$ saturated) was utilized in the cell. Potentiostatic measurements of 300-500 mV overpotential range for water oxidation was performed in 50 mV/steps with each step held until steady-state current is reached.

Figure 7:
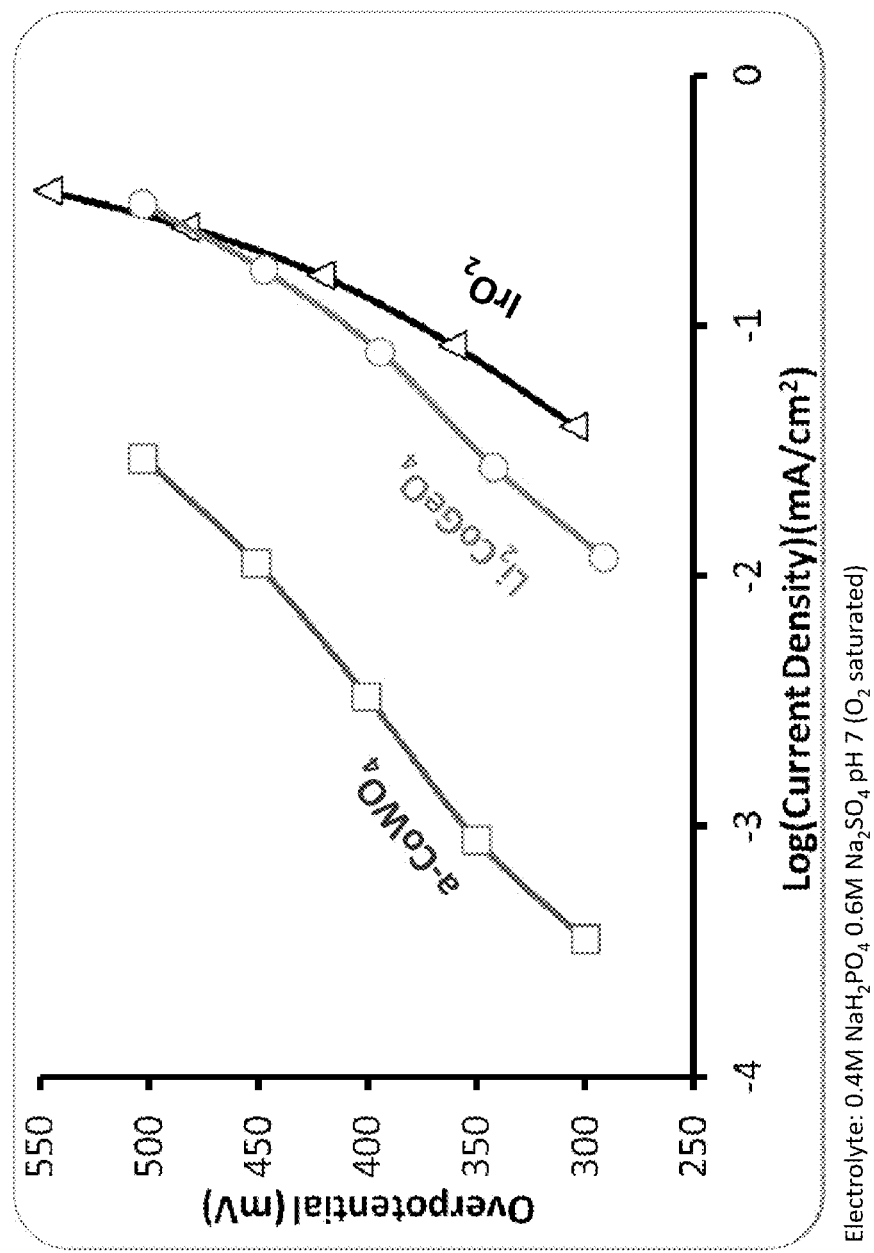
FIG. 7 is a plot of the electrochemical performance including the over potential versus the current density for $Li_2CoGeO_4$, $CoWO_4$, and $IrO_2$.

Tafel plot measurements, as shown in FIG. 7 of $Li_2CoGeO_4$ show that $Li_2CoGeO_4$ has significantly better performance per unit of surface area than $CoWO_4$, as well as comparable performance to $IrO_2$ under the same conditions and applied overpotential. The performance characteristics of the $Li_2CoGeO_4$ at a pH of 7, a desirable range of pH for an electrochemical cell for splitting water indicates an improved electrochemical catalyst for splitting water than may be produced in a large scale using a hydrothermal reaction.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A water oxidation catalyst splitting water into oxygen and hydrogen ions comprising:
    lithium cobalt germanate of the formula: $Li_2CoGeO_4$.
2. The water oxidation catalyst of claim 1 wherein the lithium cobalt germanate includes a plurality of nanoparticles having a size of less than one micrometer.
3. The water oxidation catalyst of claim 2 wherein the plurality of nanoparticles has a size of 0.5 micrometers.
4. The water oxidation catalyst of claim 1 further including conductive particles and a binder combined with nanoparticles of lithium cobalt germinate.
5. The water oxidation catalyst of claim 1 wherein the ratio of cobalt to germanium in the catalyst is approximately 1 to 1.
6. An oxygen evolution catalyst splitting water into oxygen and hydrogen ions comprising:
    lithium cobalt germanate of the formula: $Li_2CoGeO_4$.
7. The oxygen evolution catalyst of claim 6 wherein the lithium cobalt germanate includes a plurality of nanoparticles having a size of less than one micrometer.
8. The oxygen evolution catalyst of claim 7 wherein the plurality of nanoparticles has a size of 0.5 micrometers.
9. The oxygen evolution catalyst of claim 6 further including conductive particles and a binder combined with nanoparticles of lithium cobalt germinate.
10. The oxygen evolution catalyst of claim 6 wherein the ratio of cobalt to germanium in the catalyst is approximately 1 to 1.

11. An electrode for electrochemical water oxidation splitting water into oxygen and hydrogen ions comprising:
   a substrate;
   an active material in contact with the substrate, the active material including lithium cobalt germanate of the formula: $Li_2CoGeO_4$;
   wherein water is split into oxygen and hydrogen ions.

12. The electrode of claim 11 wherein the lithium cobalt germanate includes a plurality of nanoparticles having a size of less than one micrometer.

13. The electrode of claim 12 wherein the plurality of nanoparticles has a size of 0.5 micrometers.

14. The electrode of claim 11 further including conductive particles and a binder combined with nanoparticles of lithium cobalt germinate.

15. The electrode of claim 11 wherein the ratio of cobalt to germanium in the catalyst is approximately 1 to 1.

16. A process of forming a water oxidation catalyst including the steps of:
   providing LiOH;
   providing $GeO_2$;
   combining the LiOH and $GeO_2$ forming a first solution;
   providing $CoCl_2$ in a solvent;
   combining the first solution and $CoCl_2$ in solvent forming a second solution;
   exposing the second solution to a hydrothermal reaction forming $Li_2CoGeO_4$.

17. The process of claim 16 wherein the solvent is ethylene glycol.

18. The process of claim 16 wherein the hydrothermal reaction includes placing the second solution in a hydrothermal bomb at a temperature of 150 degrees centigrade for 72 hours.

19. The process of claim 16 further including the step of washing and drying the $Li_2CoGeO_4$ following the hydrothermal reaction.

20. The process of claim 19 further including the step of grinding the $Li_2CoGeO_4$ following the drying step separating the $Li_2CoGeO_4$ into particles.

* * * * *